United States Patent
Schultz et al.

(10) Patent No.: US 8,380,367 B2
(45) Date of Patent: Feb. 19, 2013

(54) ADAPTIVE SURVEILLANCE AND GUIDANCE SYSTEM FOR VEHICLE COLLISION AVOIDANCE AND INTERCEPTION

(75) Inventors: Richard R. Schultz, Grand Forks, ND (US); Florent Martel, Grand Forks, ND (US); Matthew Lendway, Tucson, AZ (US); Brian L. Berseth, Detroit Lakes, MN (US)

(73) Assignee: The University of North Dakota, Grand Forks, ND (US)

( * ) Notice: Subject to any disclaimer, the term of this patent is extended or adjusted under 35 U.S.C. 154(b) by 383 days.

(21) Appl. No.: 12/732,970

(22) Filed: Mar. 26, 2010

(65) Prior Publication Data

US 2010/0292871 A1 Nov. 18, 2010

Related U.S. Application Data

(60) Provisional application No. 61/211,304, filed on Mar. 26, 2009.

(51) Int. Cl.
- G08G 5/04 (2006.01)
- G05D 1/00 (2006.01)
- G01C 23/00 (2006.01)
- G01S 19/39 (2010.01)
- G01S 13/93 (2006.01)

(52) U.S. Cl. ............. 701/3; 701/14; 701/16; 701/120; 340/945; 340/961; 342/29

(58) Field of Classification Search ............ 701/3, 14, 701/16, 120; 342/29
See application file for complete search history.

(56) References Cited

U.S. PATENT DOCUMENTS

| | | | |
|---|---|---|---|
| 3,434,141 A | 3/1969 | Welti | |
| 4,755,818 A | 7/1988 | Conrad | |
| 4,918,442 A | 4/1990 | Bogart, Jr. | |
| 5,050,818 A | 9/1991 | Sundermeyer | |
| 5,136,512 A | 8/1992 | Le Borne | |
| 5,321,489 A | 6/1994 | Defour et al. | |
| 5,464,174 A | 11/1995 | Laures | |
| 5,581,250 A | 12/1996 | Khvilivitzky | |

(Continued)

FOREIGN PATENT DOCUMENTS

EP 1942351 A1 9/2008

OTHER PUBLICATIONS

Benjamin, Michael R. "Interval Programming: A Multi-Objective Optimization Model for Autonomous Vehicle Control." PhD thesis, Brown University, Providence RI, May 2002. 166 pages.

(Continued)

*Primary Examiner* — Thomas Black
*Assistant Examiner* — Wae Louie
(74) *Attorney, Agent, or Firm* — Kinney & Lange, P.A.

(57) ABSTRACT

A surveillance and guidance method and system for use with autonomously guided, man-on-the-loop or man-in-the-loop guided vehicles where the presence of obstacles must be considered in guiding the vehicle towards a target includes a navigation system configured to determine the position of the vehicle on which it is equipped. A communication system is configured for data exchange between the vehicle, neighboring vehicles and ground stations. A surveillance system is configured to detect and locate fixed or moving targets and obstacles. A computer is configured to track the position of targets and obstacles and to provide guidance commands or 4D flight paths to perform collision avoidance with respect to traffic regulations and procedures, and operational airspace restrictions. Additional computer tasks include station keeping or interception of targets. A command and control system is configured to interact with a user interface and control the vehicle's actuators.

31 Claims, 10 Drawing Sheets

U.S. PATENT DOCUMENTS

| | | | |
|---|---|---|---|
| 5,872,526 | A | 2/1999 | Tognazzini |
| 5,892,462 | A | 4/1999 | Tran |
| 6,208,284 | B1 | 3/2001 | Woodell et al. |
| 6,266,610 | B1* | 7/2001 | Schultz et al. .............. 701/528 |
| 6,278,396 | B1* | 8/2001 | Tran ................. 342/29 |
| 6,392,692 | B1* | 5/2002 | Monroe ................. 348/143 |
| 6,433,729 | B1* | 8/2002 | Staggs ................. 342/29 |
| 6,459,411 | B2 | 10/2002 | Franzier et al. |
| 6,483,454 | B1 | 11/2002 | Torre et al. |
| 6,531,978 | B2 | 3/2003 | Tran |
| 6,657,578 | B2 | 12/2003 | Stayton et al. |
| 6,683,541 | B2* | 1/2004 | Staggs et al. ............ 340/961 |
| 6,690,296 | B2* | 2/2004 | Corwin et al. ............ 340/961 |
| 6,785,610 | B2 | 8/2004 | Baker et al. |
| 6,789,011 | B2* | 9/2004 | Baiada et al. ............. 701/120 |
| 6,789,016 | B2 | 9/2004 | Bayh et al. |
| 6,804,607 | B1 | 10/2004 | Wood |
| 6,889,123 | B2 | 5/2005 | Wittenberg |
| 6,940,424 | B2* | 9/2005 | Philiben et al. ............ 340/945 |
| 6,965,816 | B2* | 11/2005 | Walker ............ 701/16 |
| 7,024,309 | B2 | 4/2006 | Doane |
| 7,061,401 | B2 | 6/2006 | Voos et al. |
| 7,269,513 | B2* | 9/2007 | Herwitz ............ 701/301 |
| 7,426,437 | B2 | 9/2008 | Breed et al. |
| 7,437,225 | B1* | 10/2008 | Rathinam ............ 701/14 |
| 7,451,059 | B2* | 11/2008 | Malchi et al. ............ 702/151 |
| 7,561,037 | B1* | 7/2009 | Monroe ............ 340/521 |
| 7,633,430 | B1 | 12/2009 | Wichgers et al. |
| 7,792,330 | B1* | 9/2010 | Lowder et al. ............ 382/106 |
| 7,899,616 | B2* | 3/2011 | Breed ............ 701/423 |
| 2002/0080059 | A1* | 6/2002 | Tran ............ 342/29 |
| 2003/0014165 | A1* | 1/2003 | Baker et al. ............ 701/3 |
| 2003/0052823 | A1 | 3/2003 | Carroll |
| 2003/0060936 | A1 | 3/2003 | Yamamura et al. |
| 2003/0067542 | A1* | 4/2003 | Monroe ............ 348/148 |
| 2003/0139875 | A1* | 7/2003 | Baiada et al. ............ 701/120 |
| 2005/0187677 | A1* | 8/2005 | Walker ............ 701/16 |
| 2007/0198143 | A1* | 8/2007 | Ybarra et al. ............ 701/9 |
| 2008/0215204 | A1 | 9/2008 | Roy et al. |
| 2009/0102630 | A1* | 4/2009 | Nordlund ............ 340/436 |
| 2009/0125163 | A1* | 5/2009 | Duggan et al. ............ 701/2 |
| 2009/0210109 | A1* | 8/2009 | Ravenscroft ............ 701/26 |
| 2010/0121575 | A1* | 5/2010 | Aldridge et al. ............ 701/301 |
| 2010/0131126 | A1* | 5/2010 | He et al. ............ 701/14 |
| 2010/0152932 | A1* | 6/2010 | Das ............ 701/14 |
| 2010/0292871 | A1* | 11/2010 | Schultz et al. ............ 701/3 |
| 2012/0092208 | A1* | 4/2012 | LeMire et al. ............ 342/29 |

OTHER PUBLICATIONS

Benjamin, Michael R. "The Interval Programming Model for Multi-objective Decision Making." AI Lab Technical Memo AIM-2004-021, Massachusetts Institute of Technology, Cambridge MA, Sep. 27, 2004. 33 pages.

Benjamin, Michael R. et al., "Multi-objective Optimization of Sensor Quality with Efficient Marine Vehicle Task Execution." International Conference on Robotics and Automation (ICRA), Orlando FL, May 2006. 7 pages.

Benjamin, Michael R. et al., "Navigation of Unmanned Marine Vehicles in Accordance with the Rules of the Road." International Conference on Robotics and Automation (ICRA), Orlando FL, May 2006. 7 pages.

Eickstedt, Donald P. et al., "Cooperative Target Tracking in a Distributed Autonomous Sensor Network." Proceedings of OCEANS 2006, Boston, Sep. 2006. 6 pages.

Eickstedt, Donald P. et al., "Adaptive Control of Heterogeneous Marine Sensor Platforms in an Autonomous Sensor Network." IEEE/RJS International Conference on Intelligent Robots and Systems (IROS), Beijing China, Oct. 2006. 8 pages.

Benjamin, Michael R. et al., "Autonomous Control of an Autonomous Underwater Vehicle Towing a Vector Sensor Array." International Conference on Robotics and Automation (ICRA), Rome, Italy, Apr. 2007. 8 pages.

Eickstedt, Donald P. et al., "Behavior Based Adaptive Control for Autonomous Oceanographic Sampling." International Conference on Robotics and Automation (ICRA), Rome, Italy, Apr. 2007. 6 pages.

"Sense and Avoid (SAA) for Unmanned Aircraft Systems (UAS)" FAA Sponsored "Sense and Avoid" Workshop. Oct. 9, 2009. 86 pages.

"Stanley (vehicle)" Wikipedia. Retrieved Mar. 10, 2009 from <http://en.wikipedia.org/wiki/Stanley_(vehicle)>. 3 pages.

* cited by examiner

ADAPTIVE SURVEILLANCE AND GUIDANCE SYSTEM FOR VEHICLE COLLISION AVOIDANCE AND INTERCEPTION

CROSS-REFERENCE TO RELATED APPLICATION(S)

This application claims priority to U.S. Provisional Patent Application No. 61/211,304, filed Mar. 26, 2009, which is hereby incorporated by reference in its entirety.

STATEMENT OF GOVERNMENT INTEREST

The present invention was developed at least in part with government funding pursuant to grant no. FA4861-07-R-0003 awarded by the Department of Defense Joint Unmanned Aircraft Systems Center of Excellence at Creech Air Force Base, Nevada. Further funding was provided pursuant to grant no. 50441-CI-CPS from the Defense Experimental Program to Stimulate Competitive Research awarded by the U.S. Army Research Office, part of the Department of Defense. The U.S. Government may have certain rights in this invention.

BACKGROUND

The present invention relates to methods and systems for surveillance and guidance of vehicles; more particularly, but not exclusively, the invention relates to airborne surveillance and guidance avionics equipped on Unmanned Aircraft Systems (UAS) for midair collision avoidance and interception.

To integrate UAS into the National Airspace System (NAS), the Federal Aviation Administration (FAA) requires an equivalent level of safety, comparable to see-and-avoid requirements for manned aircraft. UAS must be able to avoid colliding with air traffic or other obstacles that pose a collision hazard, as well as comply with FAA regulations and procedures.

Conventional collision avoidance systems for manned aircraft such as Traffic Collision Avoidance System (TCAS) are unsatisfactory for UAS, mainly because of the lack of autonomous mode of operation and the inability to detect non-cooperative obstacles that do not reply to interrogations, such as vehicles not equipped with transponders, military aircraft equipped with Identification Friend or Foe (IFF) systems operating in Mode 4, and aircraft operating with an interference limited or disabled transponder. TCAS is an important consideration for air traffic safety, as cooperative aircraft equipped with TCAS are required by aviation authorities to comply with Resolution Advisories (RA) provided by the system.

U.S. Pat. Nos. 6,459,411, 6,483,454, 6,657,578 and 6,789,016 suggest using transponder and transceiver equipment such as TCAS, Automatic Dependent Surveillance—Broadcast (ADSB), Station Keeping Equipment (SKE), other types of data links or a combination thereof, to perform both collision avoidance and station keeping (e.g., formation flight) with cooperative aircraft. ADS-B is viewed by the FAA as the key enabling technology for the future air traffic management system. It provides situational awareness as the ADS-B transceiver reports position, velocity and intended trajectory of neighboring vehicles by receiving data from other ADS-B equipped vehicles or from Ground Based Transceivers (GBT) broadcasting Traffic Information System (TIS) messages. ADS-B allows non-cooperative vehicles to be located, as GBT can relay ground-based radar information in TIS broadcasts. SKE is typically used by military aircraft to communicate position, range and control information between formation members for functions such as autopilot. SKE is integrated with TCAS to network surveillance information over the SKE communication links. These inventions have limited capabilities of detecting non-cooperative obstacles through the use of ADS-B, and TIS availability is constrained by ground-based radar and GBT station coverage.

Methods that have been proposed to address these problems include the use of forward-facing cameras mounted on the aircraft, as shown in U.S. Pat. Nos. 4,918,442, 5,581,250 and 7,061,401. These systems are impeded by glare, clutter and artifacts, display intolerance to highly dynamic environments, are unable to accurately determine the range and velocity of neighboring obstacles, and are usually limited to airspace monitored directly in front of the aircraft.

The systems disclosed in U.S. Pat. Nos. 4,755,818, 5,321,489 and 6,804,607 utilize laser beam technology or a combination of laser and camera technology. These inventions exhibit drawbacks similar to camera systems, except for a possible improvement in range determination.

Airborne or ground-based radars are proposed in U.S. Pat. Nos. 3,434,141, 5,050,818, 5,464,174 and 5,872,526 to alleviate some of those issues and offer accuracy suitable for the interception of targets. The significant power requirements of current radars limit the detection range in airborne applications, and reliance on ground-based radars is limited to geographical regions where fixed and mobile radars are or can be deployed.

A combination of TCAS and airborne radar is described in U.S. Pat. No. 6,208,284 and is a suitable method to satisfy the minimum requirements for collision avoidance of both cooperative and non-cooperative obstacles in any type of environment, and allows elegant handling of TCAS Resolution Advisories (RA). This invention allows for the use of TCAS RA but, besides limited range for detecting non-cooperative obstacles, the system cannot avoid terrain, operational airspace boundaries or severe weather.

U.S. Pat. Nos. 4,924,401, 5,136,512 and 5,892,462 propose several methods for performing ground collision avoidance using Above Ground Level (AGL) and Mean Sea Level (MSL) altitude sensors, Digital Terrain Elevation Database (DTED) information and operational airspace restrictions such as a minimum altitude. These inventions cannot avoid small obstacles of high elevation such as communication towers or power lines and do not accommodate for station keeping or interception modes of operation.

The systems described in U.S. Pat. Nos. 6,531,978, 6,785,610 and 7,024,309 offer improved operational capabilities and flexibility by relying on multiple data links and surveillance sensors. None of these methods, however, single-handedly manages all required modes of operation (i.e., collision avoidance, station keeping and interception of targets, take-off, landing and taxiing of the aircraft) or allows the safe integration of UAS into the National Airspace System (NAS) as these inventions lack compliance with air traffic regulations and procedures.

There is an unmet need for a surveillance and guidance system capable of self-separation, collision avoidance or interception, in all visibility conditions or in the event of sensor or communication failure, while complying with traffic regulations and procedures. Furthermore, there exists a need for such a system that is compact and lightweight, and which optimizes the employment of its navigation, communication and surveillance systems so as to maximize efficiency and minimize power requirements and cost. It is also desirable for the system to be capable of operating regardless of the command and control system or of the interface available on the vehicle, without the need for user input and in different airspace environments.

SUMMARY

The present invention provides a system that allows a vehicle to perform all operational requirements of a mission in autonomous, semi-autonomous (e.g., man-in-the-loop) or manned aircraft control while avoiding collisions and complying with traffic regulations and procedures. Embodiments of the present invention can enable a vehicle to travel safely and effectively in an environment which contains other airborne or ground obstacles qualified as moving or fixed. As a result, operational capabilities and modes of operation can be extended while increasing safety. In general, the present invention employs surveillance and communication systems to detect airborne and ground obstacles and to provide additional situational awareness. Self-separation and collision avoidance procedures can follow FAA regulations (e.g., FAR Part 91.113, Right-of-Way Rules) or instructions provided by advisory systems such as TCAS.

According to one embodiment of the present invention, a surveillance and guidance system for use in autonomous, semi-autonomous or manned aircraft control where the presence of obstacles must be considered in guiding the aircraft towards a target includes a navigation system configured to determine a position, velocity and intended trajectory of the aircraft. A communication system is configured for communication between the aircraft, neighboring airborne and ground vehicles, ground stations and radio beacons. A surveillance system is configured to detect and locate neighboring fixed or moving targets and obstacles, airports, runways and taxiways. A flight computer is configured to track the targets and obstacles, determine their position, velocity and intended trajectory, and to generate guidance commands or four-dimensional (4D) flight paths (e.g., latitude, longitude, altitude and Estimated Time of Arrival (ETA) of a set of waypoints) for the purpose of self-separation, collision avoidance, station keeping and interception while complying with air traffic regulations and procedures, and operational airspace restrictions. A command and control system is configured to display aircraft status, navigation and surveillance information, alerts, and guidance commands or 4D flight paths on a user interface thereafter referenced as a Flight Management System (FMS) and to process guidance commands or 4D flight paths to control the aircraft.

According to an aspect of the present invention, the navigation system can include a Global Navigation Satellite System (GNSS) or any of its derivative forms (e.g., Differential Global Positioning System), an Inertial Navigation System (INS) or any other sensor which allows access to GNSS or INS information. The navigation system can also include static and dynamic pressure sensors, a magnetometer and a laser range finder. In addition, the navigation system can include other avionics already equipped on the aircraft that can provide the same type of information, such as a radio navigation system or an autopilot with an integrated navigation system.

According to another aspect of the present invention, the communication system can include a Universal Access Transceiver (UAT) data link, a Mode C data link, a Mode S data link, a Mode S Extended Squitter (ES) data link, a VHF or UHF data link, an Aircraft Communications Addressing and Reporting System (ACARS) or AOA (ACARS Over Aviation VHF Link Control) data link, a VHF Digital Link (VDL), a Link 16 data link, an ARC 210 data link, a Multi-function Advanced Data Link (MADL), a Tactical Targeting Network Technology (TTNT) data link, a Tactical Common Data Link (TCDL), a Satellite Communication (SATCOM) data link, a Station Keeping Equipment (SKE) data link or other type of data link suitable for transmitting and receiving data and voice communications, Local Area Augmentation System (LAAS), Instrument Landing System (ILS) and radio beacon signals [e.g., Distance Measuring Equipment (DME) or VHF Omni-directional Radio Range (VOR)]. Stand-alone avionics need not be installed on the aircraft if an acceptable data link is already accessible on the aircraft.

According to a further aspect of the present invention, the surveillance system can include a radar altimeter, a laser range finder, an Active Electronically Scanned Array (AESA) radar system, a passive phased-array radar system, a laser, electro-optical or infrared imager or other type of surveillance sensor capable of detecting and locating neighboring fixed or moving targets and obstacles, airports, runways and taxiways. The surveillance system can advantageously use an existing onboard sensor or data link to perform the surveillance function.

According to further aspects of the present invention, the flight computer includes a memory device which suitably stores for retrieval data such as information related to characteristics, performance, status, flight plans and flight logs of the aircraft or other vehicles, navigation and surveillance information, database information pertaining to the position of targets and obstacles such as a Digital Terrain Elevation Database (DTED), information related to air traffic regulations and procedures, the location of operational airspace restrictions or other types of path restrictions such as geopolitical boundaries, as well as the computer software programs used by the flight computer. The data can be uploaded via a data link or updated automatically by the computer programs running on the flight computer. The flight computer includes a first component configured to filter and fuse the data provided by the navigation system, communication system, the surveillance system and the memory device to track the position of targets, obstacles, airports, runways, taxiways, and navigation aids. The flight computer can also include a second component that is configured to generate aircraft status, navigation and surveillance information, alerts, and guidance commands or 4D flight paths to enable the command and control system to perform self-separation, collision avoidance, station keeping and interception, in all weather conditions and all phases of flight including takeoff, landing and taxiing of the aircraft.

According to further aspects of the present invention, the command and control system is configured to display aircraft status, navigation and surveillance information, alerts, and guidance commands or 4D flight paths provided by the flight computer and to process guidance commands or 4D flight paths to control the aircraft. The command and control system can include an FMS for interaction with an operator of the aircraft and Air Traffic Control (ATC). The FMS includes a display device to visualize the aircraft status, navigation and surveillance information, alerts, and guidance commands or 4D flight paths. The FMS includes an input device which enables an operator to issue or modify guidance commands or 4D flight paths and communicate with ATC. If the user interface is at a remote location, information is relayed through the communication system. Specifically, such as in the situation of a flight director, an operator of the aircraft or ATC can be provided guidance commands or 4D flight paths on a user interface from which guidance commands or 4D flight paths can also be issued or modified. An operator of the aircraft and ATC can interact by exchanging information relayed by the communication system. The command and control system includes a Flight Control System (FCS) which processes the guidance commands or 4D flight paths issued by the flight computer or the FMS and then controls the aircraft actuators. The FCS can advantageously be an acceptable autoflight or autopilot system already accessible on the aircraft. In this case, the autoflight or autopilot system automatically translates heading, airspeed, groundspeed, altitude, vertical velocity or other high-level guidance commands, or latitude, longitude, altitude, Estimated Time of Arrival (ETA) or other 4D flight paths into actuator control signals.

The present invention can be applied for the guidance of autonomous, semi-autonomous or manned vehicles. Beside the embodiment stated above for use on an aircraft, another preferred embodiment pertains to the use on ground or marine vehicles, and more particularly on cars, trucks and other motorized vehicles traveling on roads or boats, submersibles or other motorized vehicles usable in water. It should be understood that the detailed description of the invention and the specific examples presented, while indicating certain embodiments of the present invention, are provided for illustration purposes because various changes within the spirit and scope of the invention are apparent from the detailed description of the invention and claims that follow.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

A surveillance and guidance method and system in accordance with the present invention combines the ability to safely and effectively guide a vehicle towards a target in the presence of obstacles while complying with traffic regulations and procedures. In one embodiment, the invention can follow current and possible future FAA regulations and procedures pertaining to manned and unmanned aircraft, and can comply with up-to-date standards, such as RTCA DO-178B/DO-248B (Software Considerations in Airborne Systems and Equipment Certification), RTCA DO-254 (Design Assurance Guidance for Airborne Electronic Hardware), in part or in total with RTCA SC-203 MASPS (Minimum Aviation System Performance Standards) for Sense and Avoid Systems for Unmanned Aircraft Systems, and with ASTM F2411-04 (Standard Specification for Design and Performance of an Airborne Sense-and-Avoid System). Additional features and benefits of the present invention will be appreciated in view of the description that follows. For example, the present invention can be applied to airborne vehicles, ground-based vehicles, or marine-based vehicles.

Figure 1:
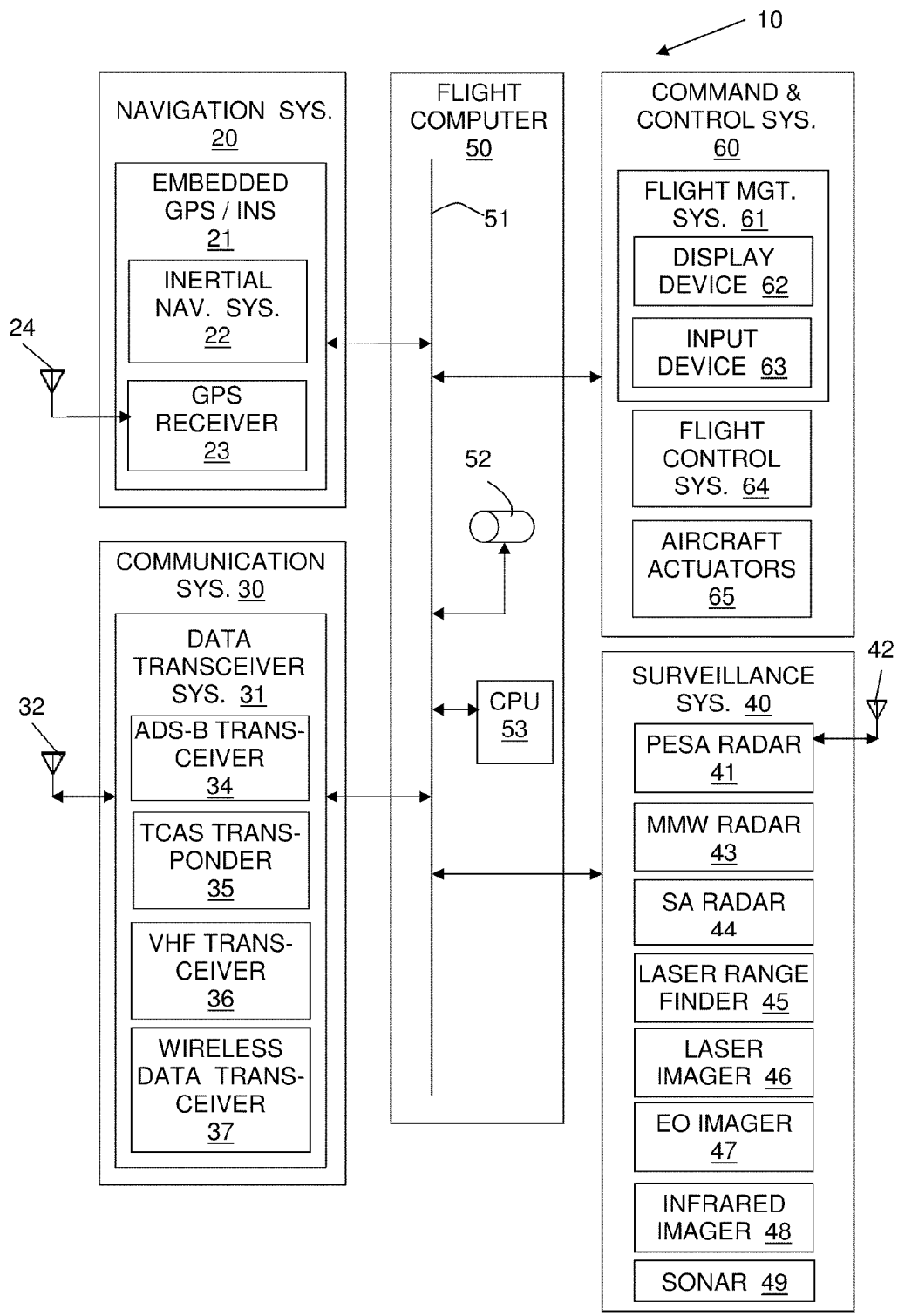
FIG. 1 is a block diagram of a system according to an embodiment of the present invention.

By way of overview and referring to FIG. 1, according to a non-limiting embodiment of the present invention, a surveillance and guidance system 10 includes a navigation system 20 configured to determine a position, velocity and intended trajectory of the aircraft. A communication system 30 is configured to allow the aircraft to communicate data with neighboring airborne and ground vehicles, ground stations and radio beacons. A surveillance system 40 is configured to detect and locate neighboring fixed or moving targets and obstacles, airports, runways and taxiways. A flight computer 50 is configured to track the position of targets, obstacles, airports, runways, taxiways and navigation aids, and to provide aircraft status, navigation and surveillance information, alerts, and guidance commands or 4D flight paths to a command and control system 60. The command and control system 60 is configured to display aircraft status, navigation and surveillance information, alerts, and guidance commands or 4D flight paths provided by the flight computer and to process guidance commands or 4D flight paths to control the aircraft.

The navigation system 20 is configured to determine a position, velocity and intended trajectory of the aircraft. In one embodiment, the navigation system 20 can include an Embedded GPS Inertial Navigation System (EGI) 21. The EGI 21 includes a GPS receiver 23 that is integrated with an Inertial Navigation System (INS) 22. A GPS antenna 24 receives GPS signals relayed to the GPS receiver 22. Any EGI 21 suitable for operation aboard an aircraft can be used, as desired for a particular application. The navigation system 20 can include a standalone GPS receiver 23 which can be, but is not required to be integrated with an INS 22 in a known manner, such as by using a Kalman filter, to replicate the output of an EGI 21. In this case, the flight computer 50, which can include a dedicated processor for the navigation system 20, runs a navigation sensor fusion routine to integrate the GPS receiver 23 and the INS 22 outputs. Navigation sensor fusion routines for aircraft are well known in the art, and a detailed explanation of their design and operation is not necessary for an understanding of the present invention. Any INS 22 suitable for operation aboard an aircraft can be used, as desired for a particular application. The GPS receiver 23 can be any Global Navigation Satellite System (GNSS) receiver capable of interpreting GNSS signals and outputting information relating to the position of the aircraft or of GNSS radio beacons. The GPS antenna 24 can be any GNSS receive antenna capable of receiving GNSS signals and that is mountable on an aircraft. The navigation system 20 can also use GPS and INS sensor information available from an existing on-board sensor or from a multifunction device such as an autopilot with an integrated navigation system. Similarly, if static pressure sensor, dynamic pressure sensor, magnetometer, laser range finder or other sensor information is suitable for position determination, the navigation sensor fusion routine can integrate other sensor information available on the aircraft to enhance the accuracy of the navigation system 20 or to limit the impact of the loss of GNSS signals.

The communication system 30 is configured to communicate data between the aircraft, neighboring airborne and ground vehicles, ground stations and radio beacons. The communication system 30 includes a data transceiver system 31. The data transceiver system 31 transmits and receives data signals relayed by one or more transmit/receive antennas 32. The transmit/receive antennas 32 can have separate or shared apertures and can be directional or omni-directional. The transmit/receive antennas 32 can be any suitable antenna that is able to relay data signals to and from the data transceiver system 31 and that is mountable on the aircraft. The data transceiver system 31 can operate as transmit and receive, transmit only or receive only, as desired for a particular application. Many data links are suitable for the communication system 30. Four data link embodiments are set forth below in a preferred embodiment, though these data links are described merely by way of example and not limitation.

A first data link of the communication system 30 can be deployed through the use of an Automatic Dependent Surveillance—Broadcast (ADS-B) transceiver or receiver 34 which uses a Universal Access Transceiver (UAT), Mode S Extended Squitter (ES) or VDL Mode 4 data link. ADS-B provides situational awareness as the ADS-B transceiver 34 reports position, velocity and intended trajectory (or provisional trajectory) of neighboring vehicles by receiving data relayed by a compatible transmit/receive antenna 32 and transmitted by other ADS-B equipped vehicles and Ground Based Transceivers (GBT) broadcasting Traffic Information System (TIS) messages. Additionally, ADS-B can provide flight information such as meteorological data through Flight Information Service (FIS) messages which can be added to the surveillance information to avoid storms, turbulences, etc.

A second data link of the communication system 30 can be deployed through the use of a Traffic Collision Avoidance System (TCAS) transponder 35 which uses a Mode C or Mode S data link. TCAS signals are relayed by one or multiple TCAS compatible transmit/receive antennas 32. If a risk of collision is established by the TCAS transponder 35, a Resolution Advisory (RA) is generated by the TCAS transponder 35 which indicates a range of vertical speeds at which the aircraft should be flown to avoid other TCAS equipped aircraft. The vertical direction of the RA is coordinated between multiple aircraft via the Mode S data link if established, so that two or more aircraft perform coordinated maneuvers to prevent mid-air collision.

A third data link of the communication system 30 can be deployed through the use of a VHF transceiver 36 to enable radio communications between an operator of the aircraft and Air Traffic Control (ATC) whenever the aircraft operates in Air Traffic Management (ATM) airspace via a VHF compatible transmit/receive antennas 32. The VHF transceiver 36 can also be used to receive Local Area Augmentation System (LAAS), Instrument Landing System (ILS) or radio beacon signals to locate airports, runways and navigation aids, providing information for takeoff, landing, and taxiing.

A fourth data link of the communication system 30 can be deployed through the use of a wireless data transceiver 37 connecting the aircraft to neighboring airborne and ground vehicles or ground stations in order to transmit and receive data or voice communications and to enable remote interaction with the flight computer 50. For use in tactical mode, such as in the context of military operation, the data link may have a low probability of detection and interception. The data link can include a Link 16 data link, which improves situation awareness by transmitting and receiving the heading and location of the aircraft and has a low probability of intercept as it uses spread spectrum technology. The data link can include a Station Keeping Equipment (SKE) data link, which is used by the military to communicate position, range, and control information to formation members for functions such as autopilot. The data link can include a Multifunction Advanced Data Link (MADL), which uses multiple phased array antennas to provide spherical coverage around the aircraft. The steered, stabilized, pencil beam MADL cannot be intercepted unless the listener is phase-locked on the beam, which is constantly moving. The data link can include a XM™ WX Satellite Weather data link, which can provide meteorological data that can be added to the surveillance information to avoid storms, turbulences, etc. The wireless data transceiver 37 can assist other data links in providing surveillance information by receiving position information of air traffic sensed by ground-based radar from a ground station, in a system analogous to Ground Based Transceivers (GBT).

It should be noted that while the ADS-B transceiver 34, the TCAS transponder 35, the VHF transceiver 36 and the wireless data transceiver 37 can be used together, as shown in FIG. 1, one or more can be omitted from the data transceiver system 31 in alternative embodiments. Final selection of the data links of the communication system 30 can be based upon the benefits, performance, costs, integration feasibility, applicable regulations and standards or as required for a particular application. Alternatively, a Tactical Targeting Network Technology (TTNT) data link, a Tactical Common Data Link (TCDL), a Satellite Communication (SATCOM) data link, an ARC 210 data link, a VHF Digital Link (VDL) or other suitable data link can be used, as desired for a particular application.

The surveillance system 40 is configured to detect and locate neighboring fixed or moving targets and obstacles, airports, runways and taxiways. For example, in one preferred embodiment, the surveillance system 40 is an Active Electronically Scanned Array (AESA) radar or a Passive Electronically Scanned Array (PESA) radar 41 with phased array antennas 42 mounted to provide spherical coverage around the aircraft. The phased array antennas 42 are any suitable antennas for transmission or reception of radar signals and that are mountable on or within the aircraft.

In another embodiment, the surveillance system 40 is a milli-meter wave (MMW) radar 43, which can be the same MADL milli-meter wave radar used for the communication system 30 that enables the surveillance system 40 to locate targets and obstacles within a distance of around 10 miles.

In another embodiment, the surveillance system 40 can be any other stand-alone sensor that can be used as desired to provide input regarding the location of fixed or moving targets and obstacles, airports, runways and taxiways, and which may advantageously already exist on the aircraft. Given by way of nonlimiting example, the sensors can include without limitation a synthetic aperture radar 44, a laser range finder 45, a laser imager 46, an electro-optical (EO) imager 47, a thermal infrared imager 48 (e.g., a short-wave infrared imager), and an acoustic sensor/SONAR 49. It should be noted that while the phased-array radar 41, the milli-meter wave radar 43, the synthetic aperture radar 44, the laser range finder 45, the laser imager 46, the electro-optical imager 47, the thermal infrared imager 48, and the acoustic sensor/SONAR 49 can be used together, as shown in FIG. 1, one or more can be omitted from the surveillance system 40 and/or additional sensors can be utilized in alternative embodiments. Final selection of the sensors used for the surveillance system 40 can be based upon the benefits, performance, costs, integration feasibility, applicable regulations and standards or as desired for a particular application.

The flight computer 50 is configured to coordinate the inputs and outputs of the surveillance and guidance system 10. The flight computer 50 can be any suitable flight computer known to the art, and handles calculation, recording and data transfer, and can include suitable software for operation in accordance with disclosed embodiments of the present invention. Data transfer is centralized by a data bus 51 which connects the navigation system 20, the communication system 30, the surveillance system 40, the flight computer 50 subsystems and a command and control system 60.

A memory device 52 operably connected to or integrated with the flight computer 50 stores for retrieval data such as information related to characteristics, performance, status, flight plans and flight logs of the aircraft or other vehicles, navigation and surveillance information, information related to the location of airports, airways, runways, taxiways and navigation aids, Digital Terrain Elevation Database (DTED) or other target or obstacle database information, information related to air traffic regulations, the location of operational airspace restrictions or geopolitical boundaries, as well as the computer software programs used by the flight computer 50. The data can be uploaded via the data link of the communication system 30 or updated automatically by the computer programs running on the flight computer 50. The memory device 52 can be volatile or nonvolatile memory, read-only or random access memory.

A Central Processing Unit (CPU) 53 of the flight computer 50 executes the computer programs resident in the memory device 52. A first component within the CPU 53 is configured to track the position of targets, obstacles, airports, runways, taxiways and navigation aids by filtering and fusing navigation system 20, data link 30, surveillance sensor 40 and memory device 52 information. A second component within the CPU 53 is configured to generate aircraft status, navigation and surveillance information, alerts, and guidance commands or 4D flight paths to enable the command and control system 60 to perform collision avoidance, station keeping and interception of targets, takeoff, landing and taxiing of the aircraft in autonomous, semi-autonomous or manned aircraft control. The CPU 53 is any suitable CPU configured to perform calculations and execute algorithms.

The command and control system 60 is configured to display or otherwise provide an operator of the aircraft with aircraft status, navigation and surveillance information, alerts, and guidance commands or 4D flight paths provided by the communication system 30 and the flight computer 50, and to process guidance commands or 4D flight paths to control the aircraft. The command and control system 60 includes a Flight Management System (FMS) 61 onboard the aircraft or at a remote location for interaction between the operator of the aircraft, the aircraft and ATC. The FMS 61 can include a display device 62 to visualize the aircraft status, navigation and surveillance information, alerts, and guidance commands or 4D flight paths. The display device 62 can be any acceptable display device such as a liquid crystal display, a plasma display, a head-up display, or an instrument panel. The FMS 61 can include an input device 63 which enables an operator or ATC to issue or modify guidance commands or 4D flight paths. The input device 63 can be incorporated with the display device 62 such as in a Control Display Unit (CDU) or Multi-Function Display (MFD), function as a touch screen, or in conjunction with any acceptable input device, such as a keypad, a mouse, a joystick or a microphone. An operator of the aircraft or ATC can be informed of guidance commands or 4D flight paths and the position of obstacles and targets on the display device 62 and can issue guidance commands or 4D flight paths through the input device 63. If the FMS 61 is at a remote location, information between the flight computer 50 and the command and control system 60 is relayed through the communication system 30. Control of the aircraft can be performed by an operator or an autopilot during standard operation but the flight computer 50 can autonomously take control of the aircraft if deemed necessary, such as when the aircraft faces imminent collision threats.

The command and control system 60 includes a Flight Control System (FCS) 64 which processes the guidance commands or 4D flight paths issued automatically by the flight computer 50 or manually from the FMS 61. The guidance commands or 4D flight paths are translated by the FCS 64 into control signals to control aircraft actuators 65 such as surface deflectors or throttle. According to an embodiment of the present invention, the aircraft may already be equipped with an FCS 64 such as a standalone autoflight or autopilot system which automatically translates heading, airspeed, groundspeed, altitude, vertical velocity or other high-level guidance commands, or latitude, longitude, altitude, Estimated Time of Arrival (ETA) or other 4D flight paths into actuator control signals. Otherwise, the flight computer 50, which can include a dedicated processor to run the FCS routines, provides the FCS 64 functionality.

In further embodiments of the present invention, the surveillance and guidance system 10 can be adapted for use with ground vehicles or marine vehicles and can include the same or similar components described above with respect to aircraft, with the database information related to the navigation of a ground or marine vehicle instead of an aircraft.

Surveillance Routine

Figure 2:
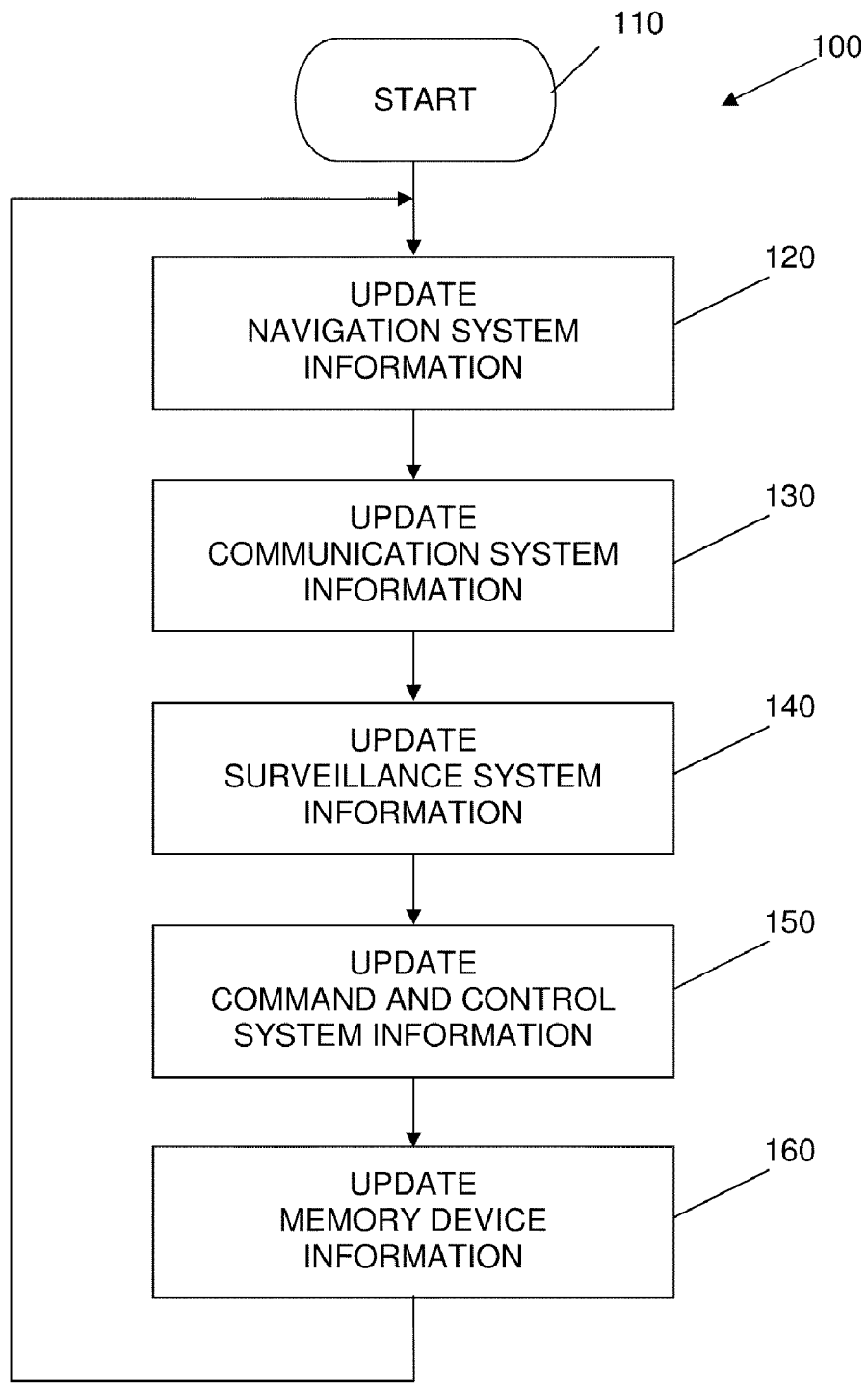
FIG. 2 is a flow chart of an embodiment of a surveillance routine of the present invention.

Referring to FIG. 2, a surveillance routine 100 performed according to an embodiment of the present invention is explained. The surveillance routine 100 and other routines thereafter make reference to components of the surveillance and guidance system 10 of FIG. 1. Routines can be executed simultaneously or in a desired order, as desired for a particular application.

The surveillance routine 100 starts at block 110. At block 120, the navigation system 20 senses a position, velocity and intended trajectory of the aircraft. Position of the aircraft can be determined in terms of latitude, longitude and altitude. Velocity can be determined in terms of heading, horizontal velocity and vertical velocity. Intended trajectory can be determined in terms of latitude, longitude, altitude and Estimated Time of Arrival (ETA) of a set of waypoints (i.e., 4D flight path). Output of the navigation system 20 represents the navigation information which is transferred to the flight computer 50 and stored in the memory device 52 via the data bus 51.

At block 130, the position, velocity and intended trajectory of targets and obstacles are received via the communication system 30. The communication system 30 is used to obtain position information of cooperative and non-cooperative traffic. For instance, if an Automatic Dependent Surveillance—Broadcast (ADS-B) transceiver or receiver 31 capable of receiving Traffic Information System (TIS) messages is included in the communication system 30, position information of non-cooperative air traffic sensed by a Secondary Surveillance Radar (SSR) can be received from Ground Based Transceivers (GBT). Output of the communication system 30 pertaining to targets and obstacles represents part of the surveillance information which is transferred to the flight computer 50 and stored in the memory device 52 via the data bus 51. Certain data links disclosed herein allow maneuvers between vehicles participating in a mission to be coordinated, as the intended trajectory of participating vehicles is known to the flight computer 50. For example, upon execution of a planned maneuver, a participating vehicle may momentarily appear as a collision threat but because the incursion is part of a known flight plan, the aircraft will not maneuver to avoid the participating vehicle.

At block 140, the surveillance system 40 detects and locates neighboring fixed or moving targets and obstacles, airports, runways, taxiways and navigation aids. The location can be determined either in terms of latitude, longitude and altitude, or in terms of distance, azimuth and elevation for sensors which reference frame is centered about the aircraft. Output of the surveillance system 40 represents part of the surveillance information which is transferred to the flight computer 50 and stored in the memory device 52 via the data bus 51.

At block 150, information related to the characteristics, performance, status, flight plans and flight logs of the aircraft or other vehicles, navigation and surveillance information, database information pertaining to the position of targets and obstacles such as a Digital Terrain Elevation Database (DTED), information related to air traffic regulations, the location of operational airspace restrictions or other types of operational boundaries (e.g., geopolitical boundaries) as well as the computer software programs used by the flight computer 50 and modes of operation (avoid obstacles, station keep target, intercept target) are sent from the FMS 61 and stored in the memory device 52 via the data bus 51. If the FMS 61 is at a remote location, the communication system 30 can be used to transfer the information.

At block 160, the flight computer 50 compares the navigation information with the surveillance information. The reference frames for the positions, velocities, flight paths and intended trajectories can be harmonized into a same reference frame. The status, flight plans and flight logs of the aircraft, as well as surveillance information regarding fixed or moving targets and obstacles, airports, runways, taxiways and navigation aids are compared with the information stored in the memory device 52, updated directly or by means of a filtering technique and saved on the memory device 52. Flight status, navigation and surveillance information, alerts, and guidance commands or 4D flight paths can be transferred to the FMS 61.

It should be understood that in alternative embodiments, the blocks of the routine shown in FIG. 2 can be executed in any order, including simultaneous execution, as desired for particular applications.

Guidance Routine

Figure 3:
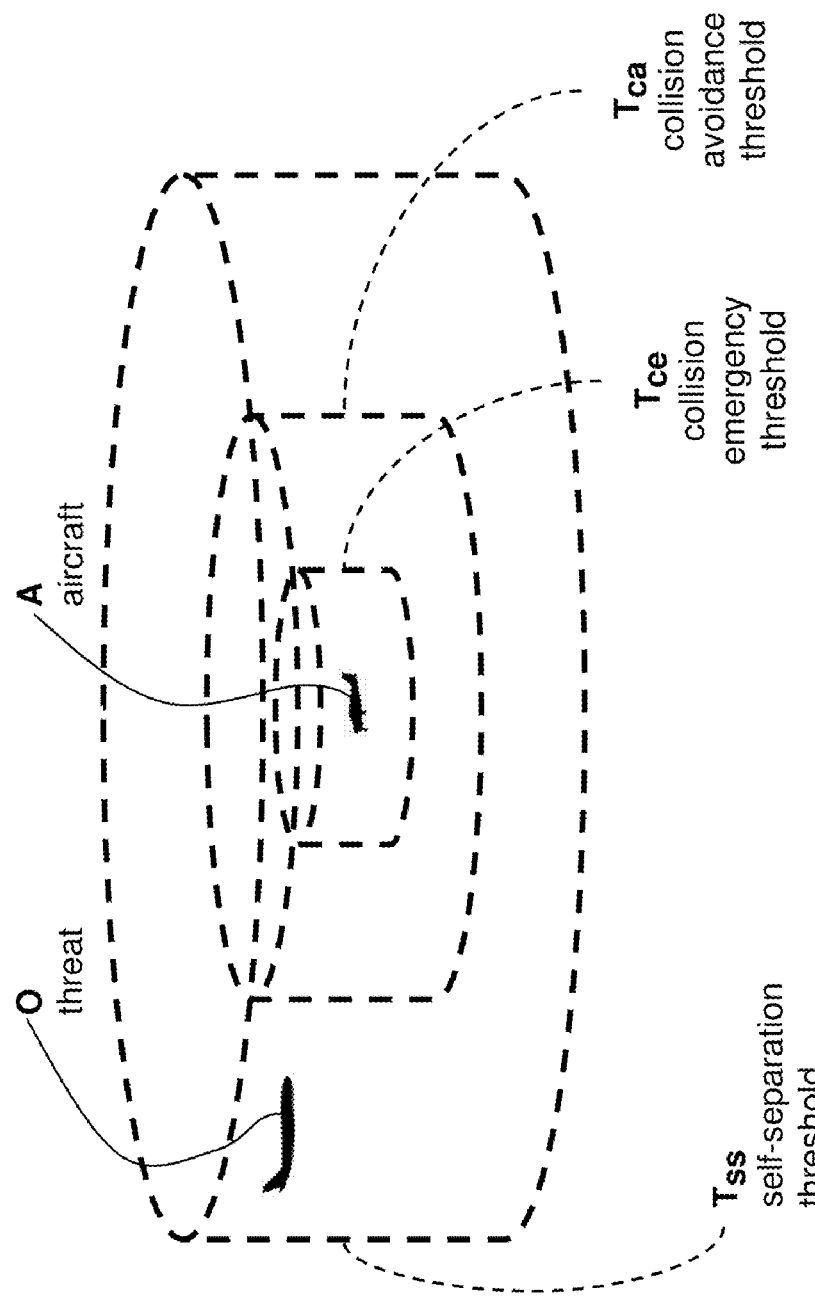
FIG. 3 is a schematic diagram of an embodiment of thresholds applicable to the guidance routine.

FIG. 3 is a schematic diagram that illustrates embodiments of thresholds applicable to a guidance routine. An aircraft A is surrounded (in 3D space) by a collision emergency threshold $T_{ce}$ (also known as a collision volume), a collision avoidance threshold $T_{ca}$ and a self-separation threshold $T_{ss}$ (also known as a collision deconfliction threshold). The respective thresholds $T_{ce}$, $T_{ca}$ and $T_{ss}$ establish sequentially larger volumes surrounding the aircraft A. In the illustrated embodiment, the thresholds $T_{ce}$, $T_{ca}$ and $T_{ss}$ are cylindrical volumes, though in further embodiments the volumes can have other shapes. An object that is present within any of the given thresholds $T_{ce}$, $T_{ca}$ and $T_{ss}$ is called a threat, as explained further below. Additional thresholds can be established in further embodiments, such as an intended trajectory threshold. A threat O (e.g., another aircraft) is shown in FIG. 3 within the self-separation threshold $T_{ss}$ but outside the collision emergency threshold $T_{ce}$ and the collision avoidance threshold $T_{ca}$. All the thresholds mentioned above can be time, distance, velocity or angle thresholds, and can be set arbitrarily, according to the characteristics and performance capabilities of the aircraft A, airspace class, flight plans, mission requirements, size, closure rate and angle of approach of threats or a target, other factors that dynamically affect the aircraft's maneuverability, or as desired for a specific application. Given by way of a nonlimiting example, distance thresholds can be used for fixed threats and targets and time thresholds for moving threats and targets.

In the illustrated example, the relative distance between the aircraft and a threat triggers a corresponding guidance routine procedure. In addition, the methods used for position tracking and uncertainty determinations (due to sensor inaccuracies and signal interruptions) to constitute the surveillance information can depend on the same thresholds or some other thresholds similar in concept. Functionally speaking, the closer an obstacle, the more precisely its position and related uncertainty may have to be determined, therefore, methods of increasing complexity can be used to make this determination.

Figure 4:
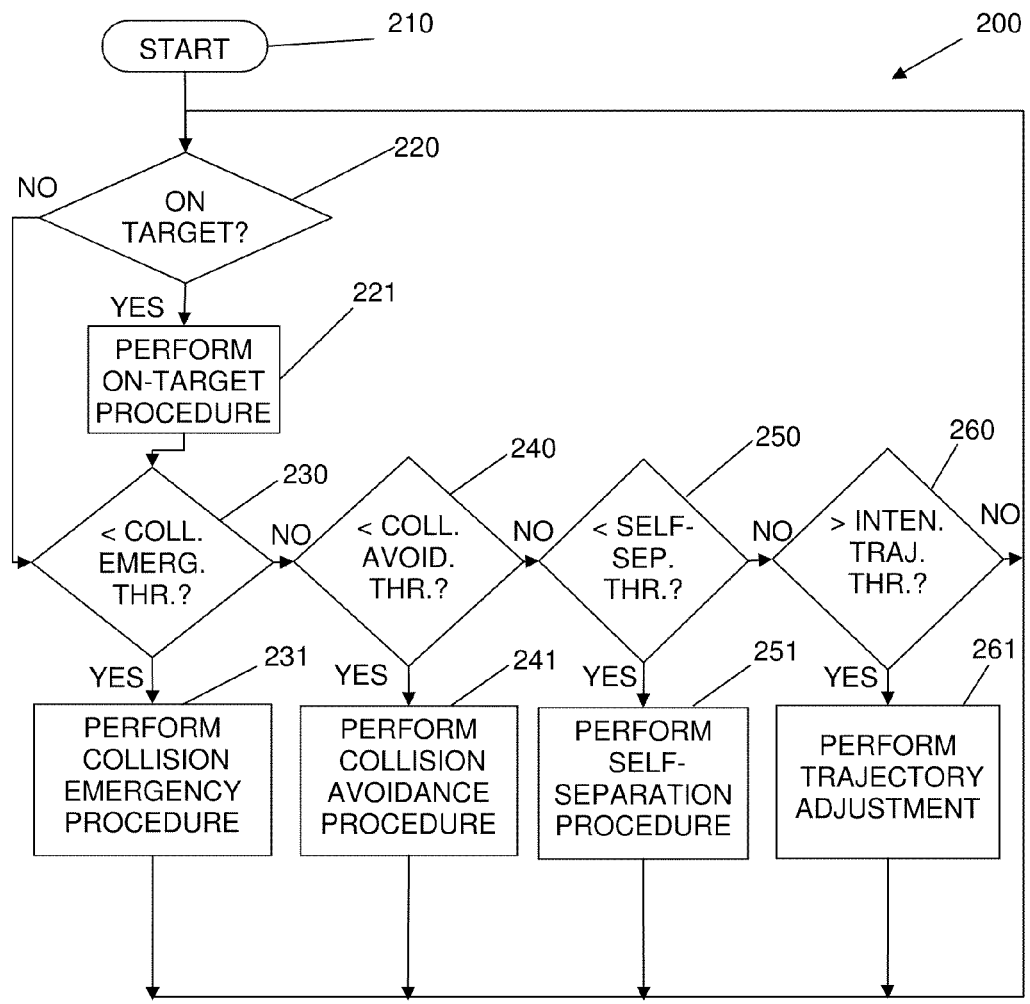
FIG. 4 is a flow chart of an embodiment of a guidance routine of the present invention.

FIG. 4 is a flow chart of an embodiment of a guidance routine 200 that starts at block 210. At a decision block 220, a determination is made whether or not the aircraft is on target. A positive on-target determination means that the aircraft has reached a station keeping or interception position with respect to a target. The station keeping position is identified as the proper position of the aircraft relative to the target. Given by way of nonlimiting example, the aircraft intent can be to trail, shadow or loiter around a target for the purpose of formation flight, air refueling, air drop or rendezvous, or to gather surveillance information on or around the target. The interception position is identified as the position for which the aircraft is considered to have reached a target. Given by way of nonlimiting example, the aircraft intent can be to navigate through a set of targets representing the position of waypoints or to intercept a target by direct impact or by means of an explosive or fragmentation charge.

If at the decision block 220 it is determined that the aircraft is on target, then at a decision block 221, an on-target procedure is performed. Given by way of a nonlimiting example, if the aircraft intent is to navigate through a set of waypoints, the on-target procedure can assign the position of the next waypoint in the list as the new target. The on-target procedure can also provide information to the operator of the aircraft, prompt the operator for input or activate other automated tasks such as gathering reconnaissance images, dropping a payload or triggering an explosive charge. If at the decision block 220 it is determined that the aircraft is not on target, then at decision block 230 a determination is made whether or not the aircraft is below a collision emergency threshold with respect to threats.

In a preferred embodiment, the collision emergency threshold defines the boundaries of the collision volume. The collision volume can be a cylindrical volume of airspace centered on the aircraft with a horizontal radius of 500 feet and a vertical height of 200 feet (±100 feet). A threat is an obstacle determined to pose a collision risk (e.g., an obstacle within the self-separation threshold $T_{ss}$). Different threats can have different thresholds.

If at decision block 230 it is determined that the aircraft is below a collision emergency threshold $T_{ce}$, then at block 231 a collision emergency procedure is performed, maneuvering the aircraft clear from imminent collision threats. The collision emergency maneuver is defined as quick and significant trajectory adjustments optimized for and performed by the aircraft as a "last resort" right before a collision becomes unavoidable. Given by way of a nonlimiting example, the collision emergency maneuver can be determined so as to maximize the distance at closest point of approach between the aircraft and threats. If at decision block 230 it is determined that the aircraft is not below the collision emergency threshold $T_{ce}$, then at decision block 240 a determination is made whether or not the aircraft is below a collision avoidance threshold $T_{ca}$ with respect to threats.

If at decision block 240 it is determined that the aircraft is below a collision avoidance threshold $T_{ca}$, then at block 241 a collision avoidance procedure is performed, maneuvering the aircraft away from close collision threats. The collision avoidance maneuver is defined as quick trajectory adjustments performed by the aircraft before a collision would occur to keep the aircraft at a safe clearance distance from threats. Given by way of a nonlimiting example, the collision avoidance maneuver can be determined so as to avoid trajectories which would result in a distance at closest point of approach between the aircraft and threats below their respective self-separation thresholds $T_{ss}$. If at decision block 240 it is determined that the aircraft is not below a collision avoidance threshold $T_{ca}$, then at decision block 250 a determination is made whether or not the aircraft is below a self-separation threshold $T_{ss}$ with respect to threats.

If at decision block 250 it is determined that the aircraft is below a self-separation threshold $T_{ss}$, then at block 251 a self-separation procedure is performed, maneuvering the aircraft away from potential collision threats. The self-separation maneuver is defined as small trajectory adjustments performed by the aircraft well before a collision would occur to keep the aircraft at a reasonable self-separation distance from threats. Given by way of a nonlimiting example, the self-separation maneuver can be determined so as to avoid trajectories which would result in a distance at closest point of approach between the aircraft and threats below their respective self-separation thresholds $T_{ss}$. If at decision block 250 it is determined that the aircraft is not below a self-separation threshold $T_{ss}$, then at decision block 260 a determination is made whether or not the aircraft is above an intended trajectory threshold.

If at decision block 260 it is determined that the aircraft is below the intended trajectory threshold, then it is assumed that the aircraft is on the appropriate flight path, and the guidance commands transmitted to the command and control system 60, if any, may or may not differ from the guidance command transmitted at the previous iteration. If the aircraft is below the intended trajectory threshold, the guidance routine 200 then returns to block 220 for a new iteration using updated navigation or surveillance information. If at decision block 260 it is determined that the aircraft is above the intended trajectory threshold, then at block 261 a trajectory adjustment procedure is performed, maneuvering the aircraft back onto its intended trajectory. The intended trajectory threshold and related trajectory adjustments are intended to allow the aircraft to return back to its intended trajectory or an equivalent trajectory suitable for furtherance of the intended mission. Given by way of a nonlimiting example, if the target is in station keeping mode, the trajectory adjustment can be a station keeping adjustment determined so as to minimize the distance between the aircraft and the station keeping position relative to the target. If the target is in interception mode, the trajectory adjustment can be determined so as to minimize the distance at closest point of approach between the aircraft and the target.

It is worth mentioning that, due to threshold settings, self-separation procedures will preclude collision avoidance procedures in most situations as the self-separation procedure is intended to maintain a reasonable self-separation distance between the aircraft and threats. However, situations may arise where a collision avoidance procedure will be performed without previous execution of a self-separation procedure, such as if surveillance information about threats is temporarily unavailable or erroneous.

The flight computer 50 determines the high-level guidance commands or 4D flight paths required for the aircraft to perform an appropriate maneuver, such as those described above, taking into account any RA provided by TCAS. The flight computer 50 communicates the high-level guidance commands or 4D flight paths to the command and control system 60 so as to provide the guidance commands or 4D flight paths to an operator or ATC via the FMS 61 or directly to the Flight Control System (FCS) 64 to autonomously control the aircraft. The flight computer 50 can directly control the actuators 65 if an FCS 64 is not available or as desired for a particular application. In the absence of obstacles, the flight computer 50 may or may not alter the trajectory of the aircraft which can fly according to the original guidance commands or 4D flight paths, which can be provided autonomously or through manual intervention.

Algorithms determining trajectory adjustments are well known to the art and are customary in such systems as Station Keeping Equipment (SKE) or some autopilots. The adjustments are determined by dynamic equations dependent on the position, velocity and intended trajectory of the aircraft and the target as well as some constraints which include maneuverability, flight envelope and operational constraints such as maximum turn rate or maximum altitude. An example collision avoidance algorithm includes an Automated Air Collision Avoidance System (Auto-ACAS). An exemplary self-separation algorithm is the Integrated Tactical Air Control System (ITACS). A number of avoidance methods and their shortcomings are further discussed in U.S. Pat. No. 6,785,610. A detailed explanation of the logic behind avoidance algorithms is not necessary for an understanding of the present invention, but an algorithm providing a guidance method suitable for the surveillance and guidance system 10 which efficiently handles multiple simultaneous objectives is more desirable and set forth below.

Guidance Method

A guidance method for determining the guidance commands or 4D flight paths can involve considering only one obstacle at a time, but situations may arise where multiple obstacles would ideally be considered by the surveillance and guidance system 10 at approximately the same time to properly guide the aircraft. Alternatively, the guidance commands or 4D flight paths generated by each obstacle could be averaged to produce a resulting guidance command or 4D flight path, but a numerical average may not represent an effective compromise as the effective maneuver may be detrimental to the aircraft.

A guidance method developed for unmanned maritime vehicles and described in the article "The Interval Programming Model for Multi-objective Decision Making", AI Memo 2004-021, by Michael R. Benjamin, Center of Ocean Engineering, MIT, Cambridge, Mass., applies behavior-based control to multi-objective decision making. The first construct is to represent multi-objective optimization problems with piecewise linearly defined objective functions in a finite decision space. In addition, the problems associated with an exponential growth of state space are countered by dealing with separate sub-situations independently. Sub-situations are behaviors which can occur simultaneously, but by producing independent objective functions for each behavior, a modular approach which grows linearly in complexity with each behavior can advantageously be used. Behaviors described in the article include following or loitering over waypoints, avoiding collisions, shadowing or trailing behind a target and following International Regulations for Preventing Collisions at Sea 1972 (COLREGS). Each behavior may or may not produce, according to thresholds, an objective function to which a priority weighting is assigned. The priority weightings reflect the degree to which the decision is made as a trade-off between behaviors based on the overall context or the mission requirements. A resulting objective function is computed as the weighted sum of each objective function, and the resulting objective function is used to determine the preferred guidance commands to be executed by the aircraft.

Figure 5:
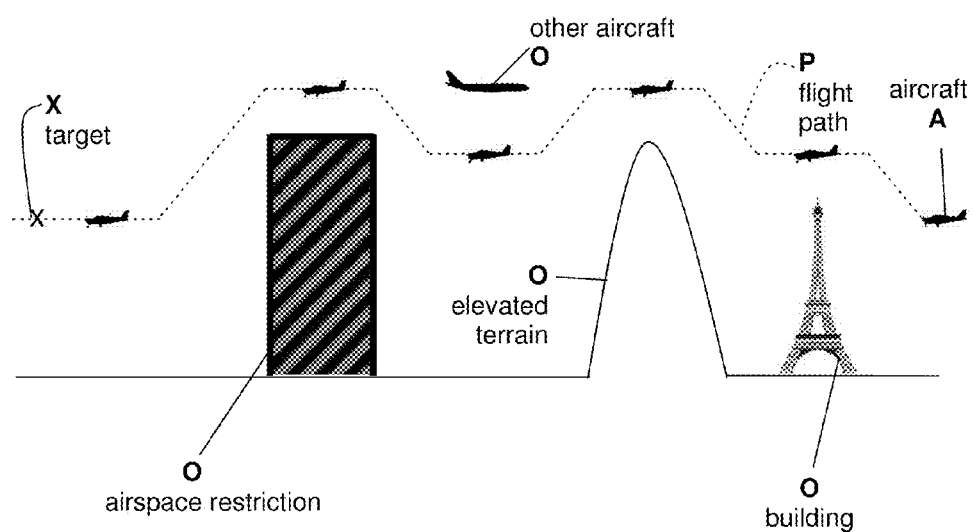
FIG. 5 is a schematic diagram of an example of the behaviors applicable to the guidance routine.

FIG. 5 illustrates some examples of behaviors applicable to the guidance method. Behaviors can include reaching a target, avoiding small fixed or moving threats such as communication towers or other aircraft, avoiding large threats such as buildings, elevated terrain, operational airspace restrictions or severe weather, and following air traffic regulations and procedures. As shown in FIG. 5, an aircraft A follows a flight path P to reach a target X while avoiding threats O that include a building, elevated terrain, another aircraft, and an airspace restriction. An extensive number of behaviors can be added to the guidance method if designed appropriately. These behaviors can include following a trajectory, loitering over a target, responding to TCAS RAs, maintaining a constant heading, speed, altitude or rate of climb and following the quickest, steadiest or boldest path, with the steadiest path defining the trajectory which minimizes the number of maneuvers, and the boldest path defining the trajectory for which actions that have a longer duration are privileged. Behaviors can also be combined, depending on functional requirements or as desired for a specific application. Several behaviors are explicitly described below based on their complexity and to provide a more complete understanding of the underlying mechanism behind the proposed guidance method. It should be noted that the behaviors not explicitly described and others may be evident to implement given the explanation provided herein.

Figure 6A:
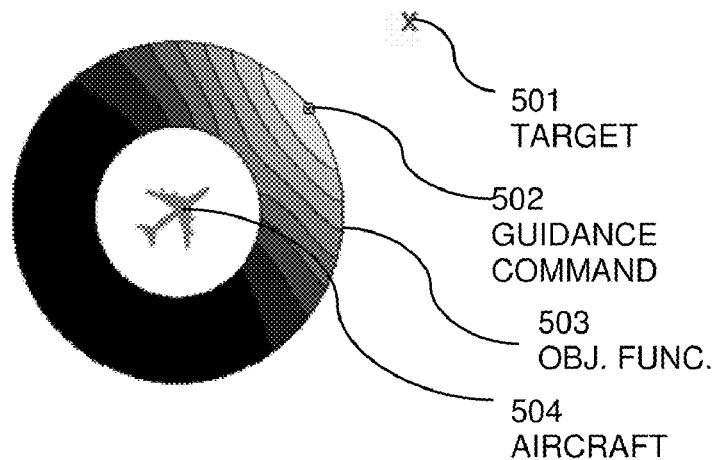
FIG. 6A is a two-dimensional (2D) objective function representation in an example situation where an aircraft is guided towards a target.

In FIG. 6A, the "reach target" behavior is illustrated (see also FIG. 7A, discussed below), with the aircraft 504 represented relative to a target 501 which position must be reached. The position of the target 501 is represented by a single point in space and can change dynamically, such as in the case of a position on or around a moving vehicle. In a preferred embodiment, the position of the target 501 is defined in terms of latitude, longitude and altitude. The output of the "reach target" behavior, if activated, is an objective function 503.

Objective functions are defined over a decision space limited by a set of explicit constraint constructs representing intervals of values. In FIG. 6A, and for clarity purposes, the objective function 503 is defined over a decision space in two dimensions as a function of possible heading and speed commands, but an objective function can be defined as a function of other type of variables such as latitude, longitude, altitude, airspeed, turn rate, vertical velocity, thrust, bank or roll angle. In one embodiment, the output of behaviors are objective functions defined in terms of possible heading, airspeed and vertical velocity commands so as to harmonize decision spaces and to obtain complete control over the position of the aircraft. In FIG. 6A, the possible heading and airspeed values are respectively represented as the angle and radius of the toroidal objective function 503 section. Minimum and maximum airspeeds are represented respectively by the inner and outer boundaries of the toroidal section. The high-level commands constraints can be fixed or dynamic, set arbitrarily or given by some of the aircraft's avionics equipment, according to the characteristics and performance capabilities of the aircraft, the airspace class, the flight plans, mission requirements, the size, closure rate and angle of approach of threats or the target, other factors which dynamically affect the aircraft's maneuverability, or as desired for a specific application.

The objective function 503 generated by the "reach target" behavior is constructed to privilege high-level commands which maneuver the aircraft 504 closer to the target 501 and can be determined so as to assign higher arbitrary values (i.e., values associated with an arbitrary function for guidance) to high-level commands that minimize the distance at closest point of approach between the aircraft 504 and the target 501. For example, in the representation of the objective function 503 in FIG. 6A, lighter areas represent higher arbitrary values and darker areas represent lower arbitrary values. Higher arbitrary values (and lighter areas in the illustrations) for the objective function 503 therefore generally represent more desirable trajectories under given conditions. The guidance command 502 is given by the value for which the maximum of the objective function 503 is obtained.

Figure 6B:
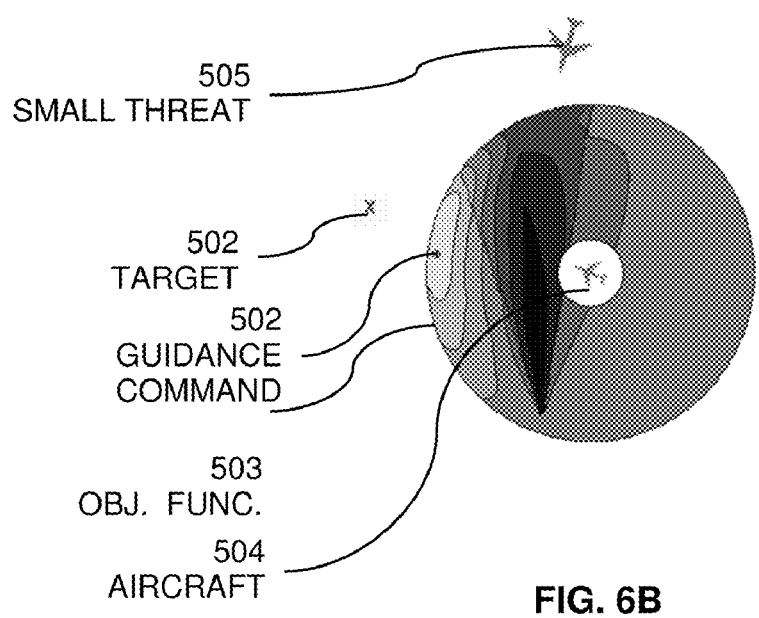
FIG. 6B is a 2D objective function representation in an example situation where an aircraft is guided towards a target in the presence of a small threat.
Figure 7A:
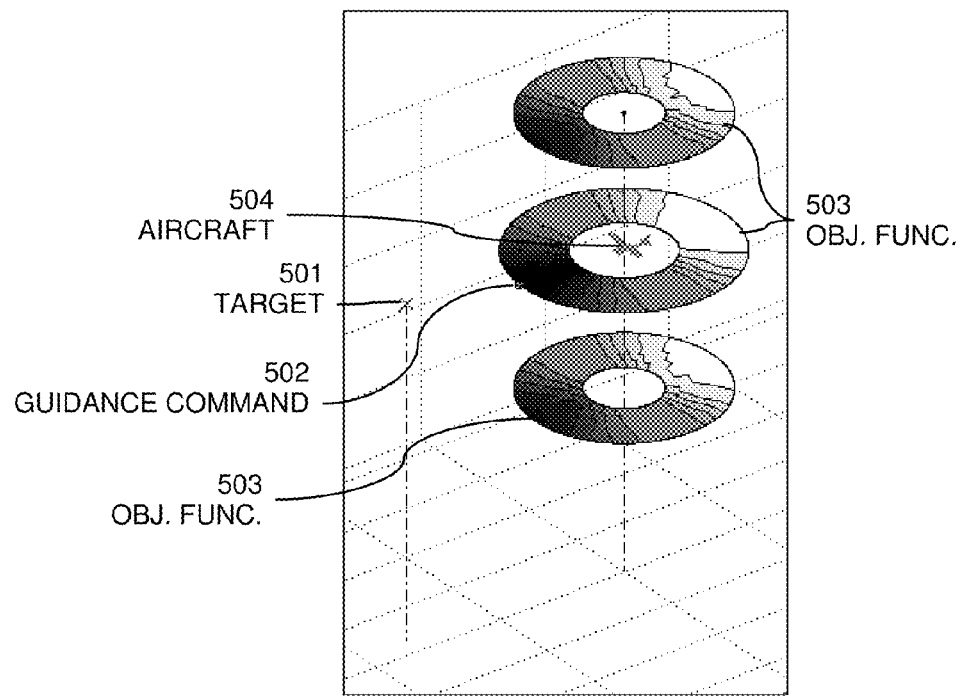
FIG. 7A is a perspective view of a three-dimensional (3D) objective function representation in an example situation where an aircraft is guided towards a target.
Figure 7B:
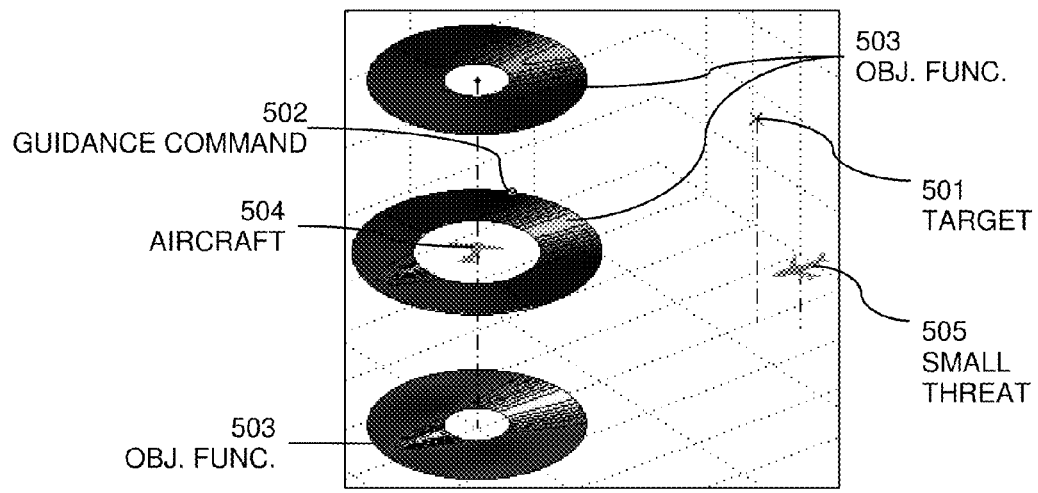
FIG. 7B is a perspective view of a 3D objective function representation in an example situation where an aircraft is guided towards a target in the presence of a small threat.

A situation where the aircraft 504 intends to reach a target 501 while avoiding a small threat 505 represented by an aircraft in motion is shown in FIG. 6B (see also FIG. 7B). In these examples, a "reach target" behavior and an "avoid small threat" behavior are activated respectively by the target 501 and the small threat 505, and each behavior generates a separate objective function. The objective function generated by the "avoid small threat" behavior is constructed to privilege high-level commands that maneuver the aircraft 504 far enough from the threat 505 and can be determined so as to assign higher arbitrary values to high-level commands which maintain at least a minimum distance at the closest point of approach between the aircraft 504 and the threat 505. The objective functions are combined in a weighted sum to produce a resulting objective function 503. In FIG. 6B, the darker area of the resulting objective function 503 represents heading and airspeed values for which the aircraft 504 may potentially collide or nearly collide with the threat 505.

The guidance method described in the present invention can process fixed and moving targets 502 with the same "reach target" behavior, and can process fixed and moving small threats 505 with the same "avoid small threat" behavior. Additionally, the "reach target" behavior and the "avoid small threats" behavior can use the same set of equations to generate their respective objective functions, as the construction of the objective functions is based on calculating the distance at closest point of approach. Only one target 501 at a time can be considered to produce the guidance commands, because the aircraft 504 cannot navigate in multiple directions for obvious reasons. Multiple small threats 505 can be considered simultaneously by the guidance method, however. Another significant advantage when dealing with multiple small threats 505 is that each small threat 505 can result in the computation of only one additional objective function; therefore, computational complexity increases at most linearly with respect to the number of small threat 505 considered for avoidance purposes.

Figure 6C:
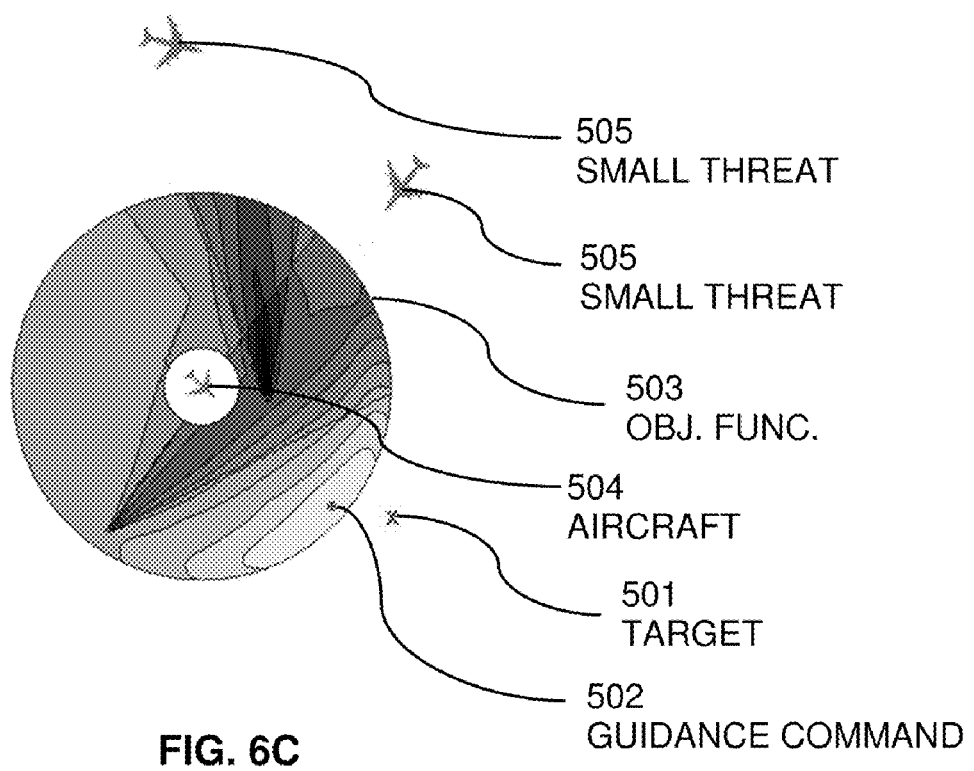
FIG. 6C is a 2D objective function representation in an example situation where an aircraft is guided towards a target in the presence of multiple small threats.

A situation involving multiple threats is shown in FIG. 6C, where the aircraft 504 intends to reach a target 501 while avoiding two threats 505 represented by aircraft in motion. Each threat 505 may activate the "avoid small threat" behavior and generate a unique objective function. This example illustrates how multiple objective functions generated by the "avoid small threat" behavior can be combined to produce the resulting objective function 503.

The "avoid small threat" behavior cannot be used to avoid large threats, defined as threats large enough to be inaccurately represented by a single point in space for avoidance purposes. Large threats can include buildings, terrain features, severe weather and operational airspace restrictions such as air corridors, airspace classes, no-fly zones or minimum and maximum operating altitude. Large threats activate a "shortest path" behavior, which replaces the "reach target" behavior, because the "shortest path" behavior finds the path of minimal distance between the aircraft 504 and the target 501 and generates an objective function 503 dependent on the additional detour distance over the computed shortest path distance caused by maneuvering around large threats. The "reach target" behavior can systematically be replaced by the "shortest path" behavior, but the "reach target" behavior is privileged in the absence of large threats in order to reduce computational complexity. The "reach target" behavior can also be used instead of the "shortest path" behavior if large threats are far enough from the aircraft 504, the target 501 or the direct path between the aircraft 504 and the target 501. The "shortest path" behavior is explained below as a two-dimensional problem for clarity purposes, but can be used in three dimensions so that the aircraft 504 can operate changes in altitude in order to follow the path of minimum distance to the target 501.

FIG. 7A is a perspective view of a 3D objective function representation in an example situation where an aircraft 504 is guided towards a target 501. FIG. 7B is a perspective view of a 3D objective function representation in an example situation where an aircraft 504 is guided towards a target 501 in the presence of a small threat 505. The 3D representations in FIGS. 7A and 7B are similar to those shown in 6A and 6B, respectively, but include further information related to a vertical dimension. In FIGS. 7A and 7B, vertical velocity values are represented as a function of vertical spacing of several concentric toroidal objective function sections 503. An inner radius of each toroidal objective function section 503 can vary, for example, as a function of characteristics of the aircraft 504 (e.g., aircraft maneuverability).

Figure 8A:
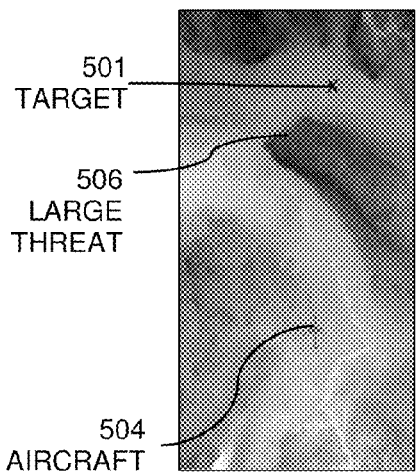
FIG. 8A is a Digital Terrain Elevation Database (DTED) map containing elevated terrain directly in the path between an aircraft and a target.

The example of FIG. 8A shows a Digital Terrain Elevation Database (DTED) map containing a large threat 506 represented by elevated terrain directly in the path between the aircraft 504 and the target 501. The position of terrain features or other large threats can be determined from surveillance information or from database information pertaining to the position of large threats such as DTED.

Figure 8B:
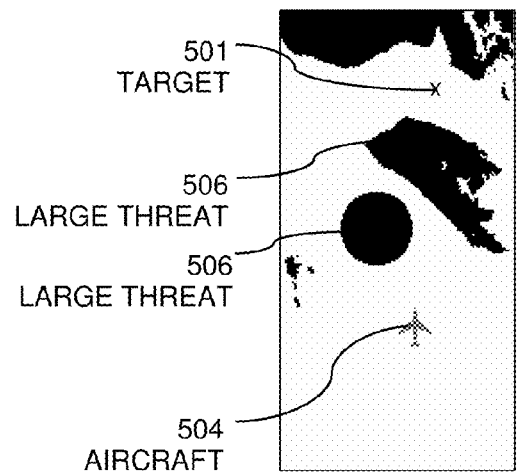
FIG. 8B is a 2D binary data map extracted from DTED information and from an operational airspace restriction database to display large obstacles at the same altitude as the aircraft of FIG. 8A.

A binary map is generated from the surveillance and database information to represent the horizontal position of large threats for a range of altitudes. In FIG. 8B, the binary map is generated for the altitude of the aircraft 504 to illustrate the problem in two dimensions. Dark areas represent the horizontal position of large threats 506 at that altitude. In this example, the large threats 506 are terrain features and airspace restrictions extracted from the DTED information and from an airspace restriction database, respectively.

Figure 8C:
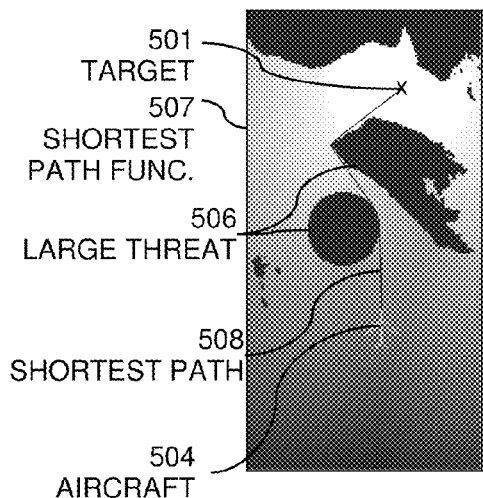
FIG. 8C is a 2D shortest path function representation in an example situation where the aircraft of FIGS. 8A and 8B is guided towards a target in the presence of large threats.

A shortest path function 507 giving the shortest path distance between points in space and the target 501 is computed and shown in FIG. 8C, where lighter areas indicate shorter path distances between points and the target 501. In this example, the location of points is defined in terms of latitude and longitude, but in a preferred embodiment, the location of points is defined in terms of latitude, longitude, and altitude. If the target 501 is fixed, the shortest path function 507 needs to be calculated only once. The number of points used to calculate the shortest path function 507 can be limited by a maximum distance between the points and the aircraft 504, by a maximum shortest path distance between the points and the target 501, or by a maximum number of points. The "shortest path" behavior can also be improved by increasing travel time on points located on the edge of large threats 506 in order to avoid issuing guidance commands that would cause the aircraft 504 to travel too close to the edge of large threats 506.

Figure 8D:
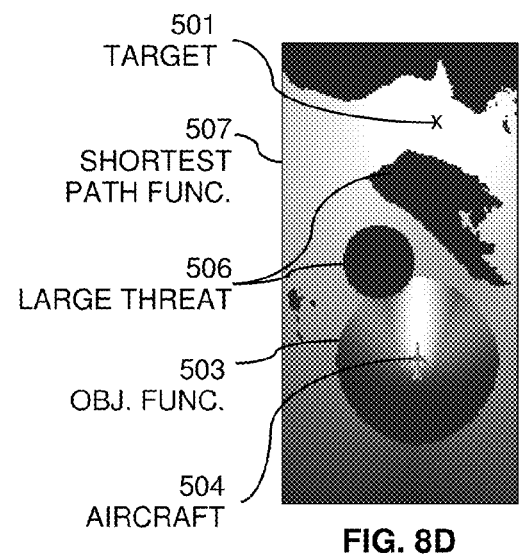
FIG. 8D is a 2D objective function representation overlaid on top of a 2D shortest path function representation in an example situation where the aircraft of FIGS. 8A-8C is guided towards a target in the presence of large obstacles.

Once the shortest path function 507 is calculated, in the example of FIG. 8D, the "shortest path" behavior generates an objective function 503 defined in terms of latitude and longitude, but in a preferred embodiment, the objective function 503 is defined in terms of latitude, longitude, and altitude. The objective function 503 generated by the "shortest path" behavior is constructed to privilege latitude and longitude positions that set the aircraft 504 closer to the target 501 and away from large threats 506 and can be determined so as to assign higher arbitrary values to latitude and longitude positions that minimize the detour distance over the shortest path 508 distance caused by maneuvering around large threats. The number of points contained in the objective function 503 can be limited by defining the objective function 503 only over points reachable from a single direct linear trajectory or within a certain distance from the aircraft 504. The objective function 503 can be translated from latitude and longitude positions over to a decision space defined in terms of heading and airspeed. In a preferred embodiment, the objective function 503 is first defined in terms of latitude, longitude and altitude, and then translated over to a decision space defined in terms of heading, airspeed and vertical velocity. The translated decision space defined in terms of high-level guidance commands is consistent with other behaviors and preferred as it allows the objective function 503 generated by the "shortest path" behavior to be combined with objective functions from other behaviors.

Additional behaviors can be added to the guidance method such as a "follow regulations" behavior. The objective function generated by the "follow regulations" behavior is constructed to privilege high-level commands that maneuver the aircraft 504 in a manner consistent with Federal Aviation Regulations (FAR) found in 14 C.F.R. §§91.3 and 91.113 or other air traffic regulations and procedures effective in the airspace in which the aircraft is operating. The objective function 503 can be determined so as to assign higher arbitrary values to high-level commands which, according to the situation, comply with air traffic regulations. The "follow regulations" behavior can itself be comprised of several behaviors depicting applicable situations which can depend on the encounter scenario (e.g., approaching head-on, converging, or overtaking), the flight phase (e.g., level flight, ascent, descent, takeoff, landing, or taxiing), the aircraft characteristics (e.g., balloon, glider, airship, rotorcraft, or airplane), or the aircraft status (e.g., towing, minimum fuel, and emergency).

The guidance routine 200 shown in FIG. 3 determines which behavior to activate if the proposed guidance method is used. Performing the trajectory adjustments of block 261 can trigger the "reach target" behavior or any other behavior used to maneuver the aircraft back onto its intended trajectory for the purpose of station keeping and interception of targets, takeoff, landing and taxiing of the aircraft. Similarly, performing the self-separation maneuver of block 251 can trigger the "follow regulations" behavior, the "avoid small threats" behavior, the "shortest path" behavior or any other behavior used to maneuver the aircraft away from potential collision threats. Behaviors can be constantly active, triggered according to thresholds or as desired for a specific application.

Examples

Figure 9A:
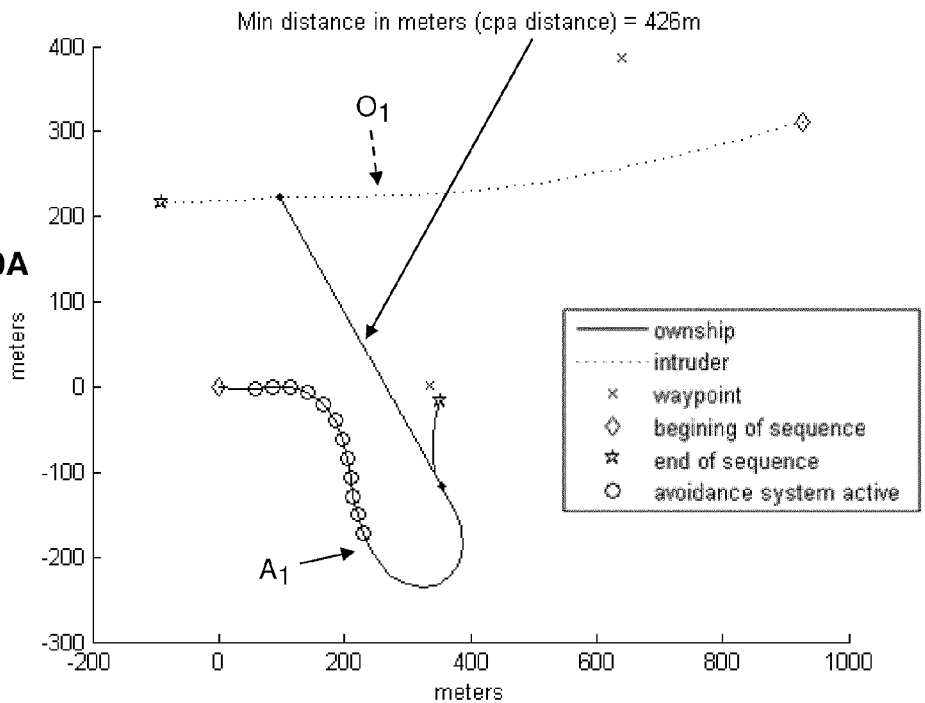
FIGS. 9A and 9B are top views of functional representations of the surveillance and guidance system depicted using measurements gathered during operational test flights.
Figure 9B:
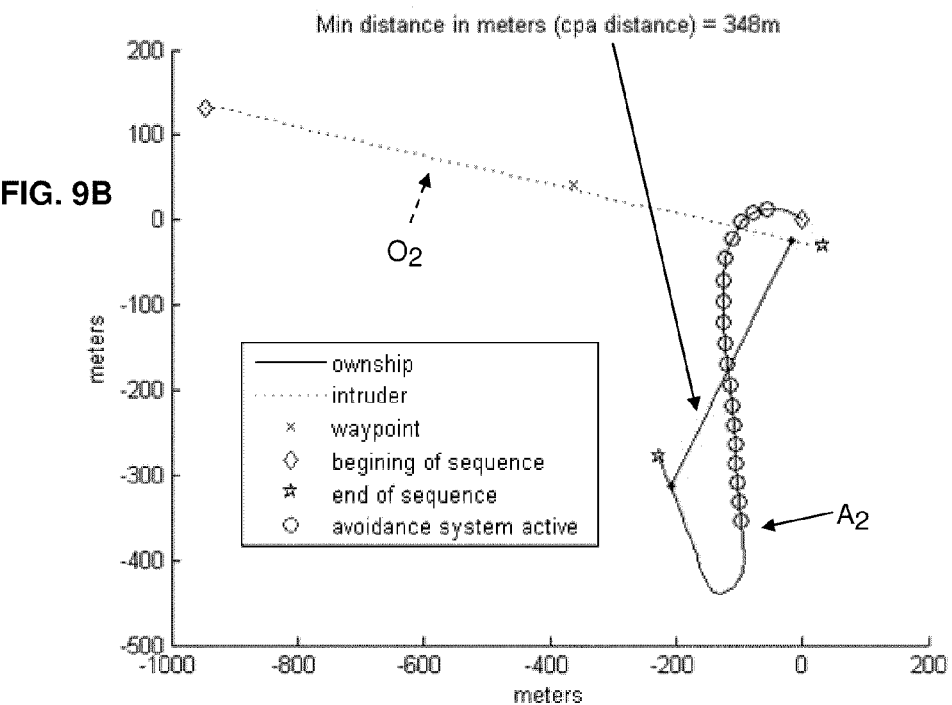

FIGS. 9A and 9B are top views of functional representations of the surveillance and guidance system depicted as a graph (with both axes depicting distance in meters) using measurements gathered during operational test flights. FIGS. 9A and 9B illustrate the trajectory of an aircraft that was equipped with the surveillance and guidance system during encounters with another aircraft. The illustrations were created using measurements gathered during operational test flights. In FIG. 9A, aircraft information $A_1$ represents flight data collected for the aircraft with the surveillance and guidance system, and obstacle information $O_1$ represents flight data collected for the other aircraft. The initial locations of the two aircraft are identified by diamond-shaped icons. A flight path corresponding to the aircraft information $A_1$ is shown with a solid line, while a flight path corresponding to obstacle information $O_1$ is shown with a dashed line. The ending locations of the two aircraft at the end of the test collection sequence are shown by star-shaped icons. Waypoints are shown by X-shaped icons. Locations at which a collision avoidance system was active to guide the aircraft corresponding to the aircraft information $A_1$ are represented by circle-shaped icons. A minimum distance between the two aircraft (i.e., closest point of approach (cpa) distance) during the testing was 426 m. In FIG. 9B, similar icons as in FIG. 9A are used to depict aircraft information $A_2$ and obstacle information $O_2$. In FIG. 9B, the minimum distance (or cpa distance) was 348 m. The test data illustrated in FIGS. 9A and 9B demonstrates that the surveillance and guidance system of the present invention could take control and alter the original trajectory only if necessary under prevailing operational conditions. In the two test illustrated in FIGS. 9A and 9B, alteration was necessary to regain a reasonable self-separation distance with the obstacles (or threats).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft guidance system for use with an aircraft, the system comprising:
   a communication subsystem configured for data exchange with cooperative airborne vehicles to acquire cooperative airborne vehicle location data and ground surveillance sources to acquire airborne vehicle location data for other airborne vehicles;
   a surveillance sensor subsystem configured to detect azimuth, elevation, and range location data for additional non-cooperative airborne objects, non-airborne obstacles and targets; and
   an embedded computer having associated software installed on the aircraft and operably connected to both the surveillance sensor subsystem and the communication subsystem operable to collect location information from the other airborne vehicles and the non-cooperative airborne objects, non-airborne obstacles and targets within a vicinity of the aircraft, predict four-dimensional trajectories of the other airborne vehicles and the non-cooperative airborne objects, non-airborne obstacles and targets within a variable number of miles, assess collision threat potential with respect to the aircraft's current flight path, and determine a trajectory to avoid collision with any of the other airborne vehicles and the non-cooperative airborne objects, non-airborne obstacles and targets.

2. The system of claim 1, wherein the surveillance sensor subsystem includes at least one sensor selected from the group comprising: an Electro-Optical (EO) Camera, a Thermal Infrared (IR) Camera, a Short Wave Infrared (SWIR) Camera, a Phased-Array Radar, a Milli-Meter Wave (MMW) Radar, a Synthetic Aperture Radar (SAR), an Acoustic Sensors/SONAR and LIDAR.

3. The system of claim 1, wherein the communication subsystem comprises at least one sensor selected from the group comprising: an Automatic Dependent Surveillance—Broadcast sensor, a Mode S based Traffic Alert—Collision Avoidance System sensor, and an Automatic Independent Surveillance—Privacy sensor.

4. The system of claim 1, wherein the embedded computer and associated software are configured to rely on one or more behaviors to generate an objective function from which the desired trajectory of the aircraft is determined.

5. The system of claim 4, wherein the objective function is piecewise linearly defined in a finite decision space.

6. The system of claim 1, wherein the aircraft is an unmanned vehicle.

7. The system of claim 1 and further comprising:
   a navigation system that includes a global navigation satellite system receiver, wherein the navigation system is operably connected to the embedded computer.

8. The system of claim 1 and further comprising:
   a control system operably connected to the embedded computer, the control system comprising:
      a user interface having a display device and an input device;
      a flight control system operable in response to commands from the embedded computer and the user interface; and
      one or more aircraft actuators controlled by the flight control system.

9. A method for unmanned aircraft operation, the method comprising:
   sensing navigation information that includes position, velocity and intended trajectory information for the unmanned aircraft;

sensing surveillance information comprising:
  gathering location information of non-cooperative airborne objects; and
  gathering location information of additional airborne vehicles and flight obstacles;
harmonizing the navigation information and the surveillance information in a reference frame;
determining if the unmanned aircraft is on-target; and
performing a maneuver if the unmanned aircraft is off-target, wherein performing the maneuver comprises:
  determining one or more behaviors that govern guidance of the unmanned aircraft to the target;
  generating an objective function, wherein the objective function is generated as a function of the harmonized navigation information and surveillance information in the reference frame and one or more behaviors that governs guidance of the unmanned aircraft to the target; and
  controlling the unmanned aircraft in accordance with a trajectory determined by the objective function.

10. The method of claim 9, wherein the step of determining one or more behaviors that govern guidance of the unmanned aircraft to the target involves selection of one or more behaviors from the group consisting of: reaching a target, avoiding small threats, avoiding large threats, following air traffic regulations and procedures, following a trajectory, loitering over target, maintaining a constant heading, maintaining a constant speed, maintaining a constant altitude, maintaining a constant rate of climb, following a quickest path, following a steadiest path, and following a boldest path.

11. The method of claim 10, wherein one objective function is generated for each of the one or more behaviors.

12. The method of claim 9, wherein the objective function is piecewise linearly defined.

13. A surveillance and guidance system for an aircraft, the system comprising:
  a navigation system configured to determine navigation information that includes a position, velocity and intended trajectory of the aircraft;
  a communication system configured to communicate location data with at least one of an airborne vehicle, a ground vehicle, a ground station and a radio beacon;
  a surveillance sensor configured to sense position data of at least one of a fixed target, a moving target, an obstacle, an airport, a runway and a taxiway within a vicinity of the aircraft;
  a flight computer configured to provide one or more guidance commands to guide the aircraft towards a target in the presence of obstacles as a function of the navigation information, the location data and the surveillance position data, wherein the flight computer is configured to track a position of one or more of the fixed target, the moving target, the obstacle, the airport, the runway, the taxiway and navigation aids and is configured to determine a velocity and an intended trajectory of the moving target and obstacles, and wherein the flight computer is configured to generate aircraft status, navigation and surveillance information, alerts and guidance commands for performing at least one of collision avoidance, station keeping and interception of targets; and
  a control system configured to process the guidance commands to control the aircraft.

14. The system of claim 13, wherein the navigation system includes an embedded GPS/inertial navigation system.

15. The system of claim 13, wherein the communication system comprises one or more data transceiver systems selected from the group comprising: an Automatic Dependent Surveillance—Broadcast transceiver or receiver, a Mode S based Traffic Alert—Collision Avoidance System, a VHF transceiver, and a wireless data transceiver.

16. The system of claim 13, wherein the surveillance sensor includes a Phased-Array Radar.

17. The system of claim 13, the control system further comprising:
  a user interface for interaction with an operator of the aircraft.

18. The system of claim 17, wherein the user interface includes a display device to display any of aircraft status information, the navigation information, the surveillance position data, alerts and the guidance commands.

19. The system of claim 13, wherein the guidance commands include at least one of changing heading, changing speed, and changing altitude of the aircraft.

20. A method for collision avoidance and interception for an aircraft, the method comprising:
  determining position, velocity and trajectory information for the aircraft;
  receiving positions, velocities and intended trajectories of any cooperative and non-cooperative vehicles;
  sensing positions of any neighboring targets, obstacles, airports, runways, taxiways, and navigation aids;
  determining velocities and trajectory information of the neighboring targets, obstacles, airports, runways, taxiways, and navigation aids if moving;
  receiving inputs from a user interface;
  fusing the determined position, velocity and trajectory information for the aircraft, the received positions, velocities and intended trajectories of the cooperative and non-cooperative vehicles, the sensed positions of the neighboring targets, obstacles, airports, runways, taxiways, and navigation aids and the determined velocities and trajectory information of the neighboring targets, obstacles, airports, runways, taxiways, and navigation aids as a fused data set;
  displaying the fused data set on the user interface;
  comparing the position, velocity and intended trajectory information for the aircraft with the positions of the neighboring targets, obstacles, airports, runways, taxiways and navigation aids, as well as the velocities and intended trajectories of the cooperative and non-cooperative vehicles; and
  if the aircraft is on-target, performing an on-target procedure; or
  if the aircraft is not on-target, performing the following steps:
    activating one or more behaviors as a function of the fused data set;
    generating an objective function as a function of the activated behaviors;
    generating a guidance command determined in accordance with the objective function.

21. The method of claim 20, wherein the step of generating a guidance command comprises performing a collision avoidance maneuver according when the position of the aircraft is below a first threshold with respect to threats.

22. The method of claim 21, wherein performing the collision avoidance maneuver comprises at least one of changing heading, speed and altitude of the aircraft.

23. The method of claim 20, wherein the step of generating a guidance command comprises performing a self-separation maneuver when the position of the aircraft is below a second threshold with respect to threats.

24. The method of claim 23, wherein performing the self-separation maneuver comprises at least one of changing heading, speed and altitude of the aircraft.

25. The method of claim 20, wherein the step of generating a guidance command comprises performing a trajectory adjustment procedure when the position of the aircraft is above a third predetermined threshold with respect to the intended trajectory of the aircraft.

26. The method of claim 25, wherein performing the trajectory adjustment procedure comprises at least one of changing heading, speed and altitude of the aircraft.

27. The method of claim 20 and further comprising:
updating a memory device with at least one of information generated automatically or received from the user interface.

28. The method of claim 20, wherein the activation of one or more behaviors as a function of the fused data set comprises one or more behaviors from the group consisting of: reaching a target, avoiding small threats, avoiding large threats, following air traffic regulations and procedures, following a trajectory, loitering over target, maintaining a constant heading, maintaining a constant speed, maintaining a constant altitude, maintaining a constant rate of climb, following a quickest path, following a steadiest path, and following a boldest path.

29. The method of claim 20, wherein an objective function is generated for each of the one or more behaviors.

30. The method of claim 29, wherein the resulting objective function is computed as a weighted sum of each objective function generated by the behaviors.

31. The method of claim 20, wherein the objective function is piecewise linearly defined in a finite decision space.

* * * * *